Oct. 6, 1970          B. E. ARNESJO ET AL          3,532,595
METHOD FOR PRODUCING HIGH-GRADE HOT WATER BY MEANS OF
COMBUSTION GASES FROM SULPHITE OR SULPHATE CELLULOSE
PROCESSES AND APPARATUS FOR CARRYING OUT THE METHOD
Filed June 2, 1966          2 Sheets-Sheet 1
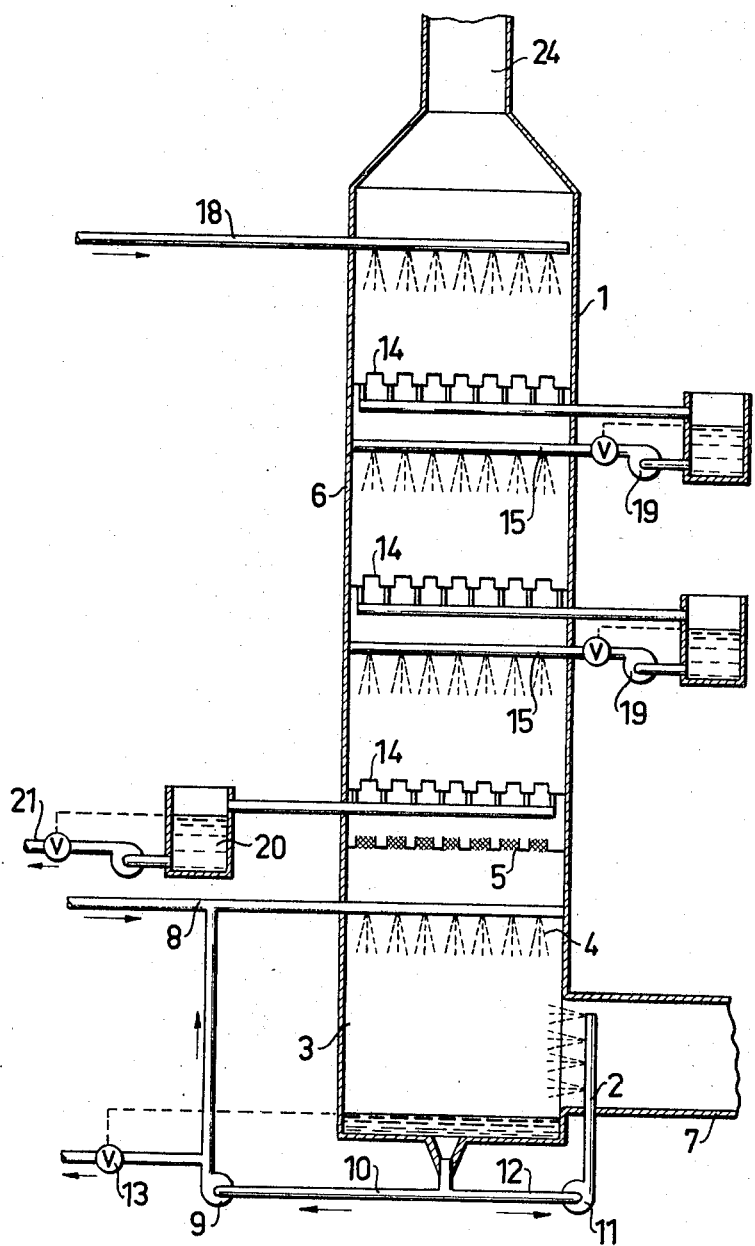
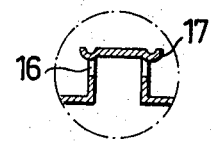
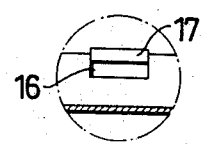
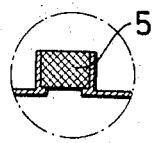

Fig.5

# United States Patent Office 3,532,595
Patented Oct. 6, 1970

3,532,595
METHOD FOR PRODUCING HIGH-GRADE HOT WATER BY MEANS OF COMBUSTION GASES FROM SULPHITE OR SULPHATE CELLULOSE PROCESSES AND APPARATUS FOR CARRYING OUT THE METHOD
Bengt Erik Arnesjo, Husum, Rolf Karl August Brannland, Alfredshem, Hans Otto Gyllensten, Husum, and Sven Olof Sanberg, Alfredshem, Sweden, assignors to Mo och Domsjo Aktiebolag, Ornskoldsvik, Sweden, a corporation of Sweden
Filed June 2, 1966, Ser. No. 554,835
Claims priority, application Sweden, June 2, 1965, 7,250/65
Int. Cl. D21c 11/06
U.S. Cl. 162—47                                   11 Claims

ABSTRACT OF THE DISCLOSURE

A method is provided for heating water which is sufficiently pure to allow its use in pulp washing and/or pulp bleaching processes, employing waste gases obtained from burning waste liquor from the sulphite or sulphate cellulose processes, wherein the waste gases are first purified and then countercurrently contacted with atomized water to heat the water to a temperature greater than about 50° C. An apparatus for use in heating hot water to a temperature greater than 50° for use in pulp washing and/or pulp bleaching processes is also provided.

---

The invention relates to a method for producing high-grade hot water by means of waste gases from the burning of waste liquor obtained in the sulphite or sulphate cellulose pulping process, in which the hot water can be supplied direct to the pulp washing and bleaching sections of the sulphate plant; and to an apparatus for carrying out the method.

When burning evaporated waste liquor, obtained from the digestion of wood in accordance with sulphite or sulphate methods, in a soda recovery plant, large quantities of heat are released which can substantially be utilized by cooling the gases in a boiler. However, such indirect cooling does not permit the waste gases to be cooled to a temperature lower than 120° C. since sulphuric acid condensation begins to occur in the sulphate process at this temperature, with resulting risks of corrosion. Attempts have been made, using black liquor, to cool to a somewhat lower temperature by direct cooling, but this causes difficult air-contamination problems due to hydrogen sulphide and organic compounds being volatilized from the black liquor. A portion of the heat remaining in the waste gases can, however, be utilized by passing the waste gases, arriving from the boiler and cooled down to approximately 120° C., through a special flue-gas scrubber wherein the waste gases are further cooled—either direct or indirect—with low-temperature water. If direct cooling is used—in which case water having a temperature of approximately 1–25° C. is injected in spray form direct into the scrubber, collected and transferred to the place of use—an acceptable temperature of the hot water is obtained, i.e. approximately 60° C. However, the majority of the impurities—particularly when producing neutral scrubber water—in the waste gases, such as soot and corrosive gases (in the sulphate process e.g. 0.03–0.10% $SO_2$ and 0.001–0.020% HCl, in the sulphite process e.g. 0.2–0.5% $SO_2$ and 0.001–0.01% HCl), will be absorbed in the water and make it unusable for direct use in the pulp washing and bleaching section of the plant. In the sulphite process an addition of 1 liter of water per m.$^3$ of waste gas causes, for instance, 1–3 g./l. $SO_2$ and 0.3–0.01 g./l. HCl to be obtained in the hot water, whilst in the sulphite process still higher values are obtained if the scrubber water is kept in the proximity of the neutral point on removal from the scrubber, which is necessary from the point of view of corrosion. If indirect cooling is used in the scrubber in such a way that the cooling water injected direct, is collected and passed through the primary conduit in a heat exchanger, hot water being removed from the secondary side of said heat exchanger, the produced hot water attains a temperature of only approximately 40–50° C. i.e. a much lower temperature than with direct cooling, which necessitates after-heating, with heat taken from another heat source. Furthermore, the installation of a heat exchanger involves considerable extra investment costs which increase with reduced temperature differences between the scrubber water and pure water.

The present invention intends to eliminate the aforementioned drawbacks and to make possible the production of a high-grade hot water by means of waste gases from the combustion of waste liquor taken from sulphite or sulphate processes, which hot water without hindrance can be supplied direct, in an economic manner, to the pulp washing and bleaching sections of the plant. The method according to the invention is characterized in that the waste gases, after being heated to a temperature of 100–140° C. and possibly after being passed through a mechanical or electrostatic dust separation device, are treated in a flue gas scrubber with complete wetting to substantially completely free them of solid particles, sulphur dioxide and hydrogen chloride by means of an alkaline aqueous solution, made alkaline by an addition of pure alkali, green liquor, white liquor or sulphide, and in one or more subsequent stages cooled direct in counter current with water to a temperature of 5–55° C.

Normally nozzles are used to provide good contact between washing liquid and gas and to atomize the liquid, suitably at a pressure of 0.3–3 kg./cm.$^2$, but the liquid can also be atomized by means of rotating rolls or brushes, although a less uniform distribution of droplet size is obtained in this way. Practical tests have proved that when using a large quantity of liquid a relatively low nozzle pressure will be sufficient so that at 3.3 l. of liquid per m.$^3$ gas it is possible to work with 0.3–0.5 kg./cm.$^2$, but at 0.67 l. liquid per m.$^3$ gas a pressure of up to 2–3 kg./cm.$^2$ must be used.

To avoid corrosion in the metallic portions of the washing apparatus it has proved necessary to adopt specific measures to rapidly and completely saturate the inflowing hot gas with water and cool the same down to its dew point. If no such measures are taken temporary and local drying of washing liquor will cause difficult corrosion attack on metallic surfaces, for instance nozzle pipes, splash plates and collecting bottoms, even though these be manufactured of high-alloyed acid resistant steel. It has been proved possible to obtain a rapid saturation of the gas by placing a number of nozzles, suitably 10–30 having a relatively high pressure—2–5 kg./cm.$^2$, in immediate connection with the gas inlet in the washing section and introduce a quantity of liquid through the nozzle corresponding to 0.33–0.83 l. per m.$^3$ gas.

Subsequent to treating the gas with the alkaline washing liquid it is desirable to separate the major portion of entrained liquid droplets since a certain percentage of salt in the hot water causes corresponding chemical consumption, if the hot water is to be used in pulp bleaching. This droplet separation process can be accomplished in a variety of ways, for instance by using wire mesh separators which function best at a gas velocity of approximately 3 m./s., or conventional impact separators functioning at a gas velocity of 8–12 m./s. in the slots. It is important when installing the drop separator to maintain a good distribution of gas in the flue-gas scrubber by dividing the separator up into sections, each having a width of at the most 10% of the total cross section.

Cooling of the gas for the production of hot water can similarly be effected in an apparatus provided with nozzles or with rotating droplet-forming elements. Since it is generally desired to reclaim a large portion of the heat content of the flue gas and at the same time produce hot water at as high a temperature as possible, it is necessary to adopt a multi-stage cooling process, the water being passed in counter current to the flue gas so that the hot water produced can be removed from the section into which the flue gas is led subsequent to the alkali washing process, and the cold water supplied to the section where treatment of the flue gas is terminated.

With respect to the design of horizontal scrubbers no major difficulties are to be met with when separating the various sections. This can be done by means of vertical walls covering 40–60% of the cross section of the scrubber, the water being collected on corresponding surfaces of the scrubber bottom and may be pumped over to the nozzles in adjoining sections.

With respect to vertical scrubber designs it is necessary to introduce collecting bottoms which communicate with corresponding pumps. These bottoms should be so designed that a good distribution of gas in the apparatus is maintained. This can be achieved either by arranging slots over the whole scrubber area, at a spacing of not above 20% of the area, or by arranging bottoms, not provided with slots, alternately on both sides of the symmetry line of the scrubber so that 40–60% of the area is covered, and coordinating these bottoms with banks of nozzles so that the liquid from each nozzle bank passes over the opening in a bottom and is collected on the underlying bottom. The liquid arriving from the washing process contains mainly sodium sulphite together with smaller amounts of sodium thiosulphate and sodium chloride. This solution may suitably be recirculated to the tank in which the melt is dissolved. The content of alkali may be varied within wide limits, 100–5 g./l. $Na_2O$, but for practical reasons more suitably within the limit 30–50 g./l. $Na_2O$.

The temperature of the outgoing scrubber water may, in suitable proportions between gas and liquid load, be raised to a value which lies very close to the dew point of the gas, or usually somewhat over 60° C. The percentages of dissolved salts of the scrubber water normally reach 0.1–0.3 g./l. $SO_2$ and 0.030–0.005 g./l. HCl, and the water can therefore without further ado, be used for instance in the bleaching process.

The accompanying drawings illustrate two embodiments of an apparatus according to the invention.

FIG. 1 shows a longitudinal section of an apparatus with vertical gas flow.

FIGS. 2–4 show details of the apparatus according to FIG. 1 in larger scale.

FIG. 5 shows an apparatus with horizontal gas flow.

The arrangement according to FIG. 1 comprises a container 1 provided with wetting means 2 in the gas inlet 1 and with a washing zone 3 in which means 4 are provided for atomizing washing liquid, and intermediate droplet separating means 5, an enlarged detail of which is shown in FIG. 4, and a cooling zone 6 in one or more stages.

The flue gases arrive through the conduit 7 and subsequently pass the washing arrangement 2 in which the gases are sprayed with alkaline washing liquid, sprayed through nozzles in a nozzle bank. Thereafter the gases pass through the washing zone 3 wherein they are sprayed with alkaline washing liquid through nozzles in a nozzle bank. Fresh alkaline washing liquid is supplied through the conduit 8 whilst the alkaline liquid collected on the bottom of the washing zone is recirculated firstly via the pump 9 through the conduit 10, and secondly via the pump 11 through the conduit 12. Alkaline washing liquid is removed out of circulation via a level control valve 13 connected to the pressure side of the pump 9. On leaving the washing zone the gases pass the droplet separator 5. This may suitably be constituted of a bottom provided with a wire mesh element situated between gas-tight plates according to the arrangement illustrated in FIG. 4. Other suitable nozzle devices, not shown on the figures are for instance, impact plates so arranged that the gas is imparted a sinusoidal movement. Conventional cyclones, however, are not suitable in this context since they give a poor distribution of gas. Thereafter the gases pass through the cooling zone 6, which in the device shown in FIG. 1 is divided up into three stages each being provided with a bottom 14 above which the cooling water is injected through nozzles in the nozzle bank 15. The bottom 14 may suitably be designed as a grid bottom, bell-type bottom or so called angle-iron bottom, but with respect to the high gas load it is suitable to use a modification of the bottom type in a plurality of parallel upwardly curved rows of gas ports 16 provided with vertical slots through which the gas passes. Such an arrangement is shown in the detail sketches FIG. 2 (vertical projection, cross section) and FIG. 3 (side projection). The plate portions facing the gas ports may be advantageously bent upwards to form a groove 17 to prevent liquid from running down direct into the gas port.

With extremely large quantities of gas it has been proved advantageous in vertical scrubber plants to position the whole gas passage to one side of each bottom, whilst arranging the collecting means on the other side so that the gases are imparted a winding movement through the container. In this context the banks of nozzles may be placed directly above or in the gas channel in front of the next bottom.

Cold water is passed into the cooling zone through the conduit 18 and is caused to pass the gases in counter current by introducing the collecting water from a bottom, via the pump 19, into the nearest underlying bank of nozzles. With low liquid loads it is advantageous to also allow a portion of the collecting water to be recirculated within each bottom. Hot water is removed from the lowest bottom in the cooling zone via a level-controlled container 20, via the conduit 21. Atomizing of the liquid in the cooling zone 6 can naturally also be effected in a different way than through nozzles, for instance by using rotating vaned rollers (splash rollers) or brushes.

Figure 5:
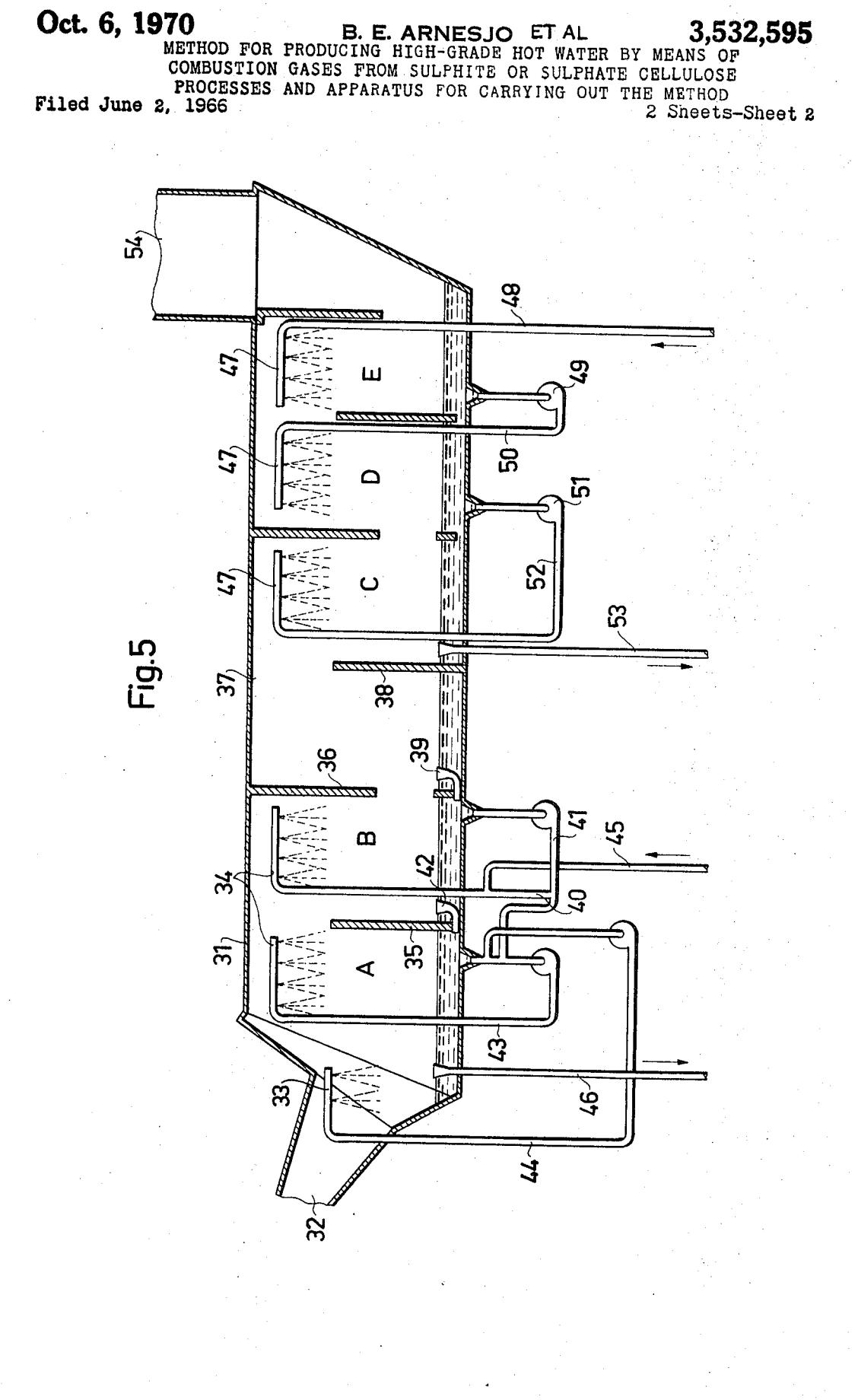

FIG. 5 shows a horizontal container according to the invention. The gas enters the container 31 through the inlet 32 and passes the washing zone wherein it is wetted with alkaline liquid, injected through the nozzle bank 33, and passes thereafter into the washing zone where it meets alkaline washing liquid in two chambers A and B, the washing liquid being injected through the nozzle banks 34. Between the chambers is arranged a vertical partition 35 departing from the bottom container and leaving free paths for the gas in the upper portion of the container. Arranged at the gas outlet from the last mentioned chamber is a vertical partition 36 departing from the upper portion of the chamber and leaving a free passage for the gas in the lower portion of the container. Thereafter the gases flow into a droplet separator 37 comprising a chamber provided with a partition 38 departing from the lower portion of the container and leaving a free passage for the gas through the upper portion of the container. The gases in the drop separator obtain a substantially upwardly directed movement whilst separated drops of alkaline washing liquid are collected on the bottom of the drop separator and, via a spill-way 39 are passed into the nearest portion of the washing zone, i.e. the chamber B. The liquid in the bottom of this washing zone is partly recirculated through the conduit 40 and partly continues via the conduit 41 to the nearest lying washing chamber A where it is injected via the nozzle bank. Situated between the chambers A and B is a spill-way 42. The washing liquid collected in the chamber A is recirculated firstly to the nozzle bank in the same chamber, via the conduit 43, and secondly to the washing zone through the conduit 44. The first washing liquid is introduced into the chamber B via the conduit 45 which is connected to the circulation conduit 40, whilst used washing liquid is removed from a spill-way in the chamber A via the conduit 46. Gases enter the cooling zone from the drop separator, the cooling zone being divided up into three chambers C, D and E, each being provided with a bank of nozzles 47 through which the water is introduced. Mounted between the chambers are partitions departing alternatively from the upper and lower portion of the container but which nevertheless leave free communication of the liquid between the chambers. Cold water is introduced through the conduit 48 to the nozzle bank in the chamber E, from the bottom of which the collected water is transferred to the chamber D by the pump 49 via the conduit 50, where it is injected through the nozzle bank of the chamber. The water collected in the chamber D is passed by the pump 41 via the conduit 42 to the nozzle bank of the chamber C. Hot water is taken from the chamber C via a spill-way, through the conduit 53. It is necessary to provide for free liquid communication between the chambers C, D and E because of the difficulty in obtaining a pump giving the optimum amount of liquid at the high liquid load and small amounts of water concerned in the present context. At low liquid loads in relation to the treated quantity of gas it is possible to introduce recirculation of water in each of the chambers C, D and E. It is naturally also possible to introduce rotating vaned rollers (splash rollers) or bristles instead of nozzle banks either solely in the cooling zone or throughout the whole container.

Both of the containers shown in FIGS. 1 and 5 may be provided with an additional drop separator (not shown in the figure) in their outlets, to separate entrailed drops of water.

In the following examples the gas volumes are calculated for normal temperature and atmospheric pressure.

EXAMPLE 1

100,000 m.$^3$/h. flue gases obtained from the burning of waste liquor from sulphate cellulose process containing 0.4 g./m.$^3$ solid particles, substantially $Na_2SO_4$ and soot, and 0.05% $SO_2$ and 0.005% HCl were passed at a temperature of 130° C. and a dew point of 64° C. to a vertical washing device in which the gas was first wetted with 500 l./min. alkaline washing liquid which was injected at a pressure of 2.4 kg./cm$^2$ through 16 nozzles disposed in two vertical rows on each side of the gas inlet, and thereafter brought into contact with alkaline washing liquid having pH 7.5. The washing device, above the washing zone, was provided with a drop separator, after which followed a cooling zone.

The washing arrangement comprises a cylindrical tower according to FIGS. 1-4, having a diameter of 5.5 m., in which the gas rises upwards and the alkaline washing liquid is sprayed downwards through 80 full cone nozzles placed at the same level approximately 3 m. over the gas intake and each having the capacity of 25 l./min. at 1.5 kp./cm.$^2$ nozzle pressure. The washing liquid was collected on the bottom of the tower and recirculated. The washing liquid, in a steady state, was continuously supplied with 100 l./min. diluted green liquor or white liquor having a total percentage of alkali corresponding to 20 g./l. NaOH whilst the same corresponding amount of alkali, which was reacted substantially to sulphite, sulphate and chloride, was carried away through spill-ways.

An analysis on the washing liquid through the spill-way gave the following compositions:

| | g./l. |
|---|---|
| $Na_2O$ | 28 |
| $SO_3^{2-}$ | 27 |
| $CO_3^{2-}$ | 5 |
| $SO_4^{2-}$ | 9 |
| $S_2O_3^{2-}$ | 2.5 |
| $Cl^-$ | 3.0 |

Subsequent to the washing process the gas passes through a drop separator arranged immediately above the washing zone and comprising six 300 mm. wide and 150 mm. thick wire mesh elements disposed at 460 mm. distance between gas-proof plates, the drop percentage being reduced to approximately 2 mg. NaOH per m.$^3$ flue gas.

Above the drop separator in the lower portion of the cooling zone is located a collecting bottom made of acid proof plate provided with ten rows of raised gas ports having 250 mm. height and a width of 150 mm. which are provided on either side with 90 mm. high and 300 mm. long slots, placed with a division of 450 mm., through which the gas passes. The hot water is led away from the bottom collecting bottom via pipe 11 connected to a main pipe which in turn is connected to a level-control pump container.

The gas is cooled in the cooling zone of the washing arrangement in three stages. Located in each stage is a collecting bottom and a series of nozzles through which the cooling liquid is sprayed, mounted approximately 4 m. above the bottom. There are 80 nozzles in each stage and each nozzle is 75 l./min. at 0.5 kp./cm.$^2$. It has been proved with this nozzle size that the gas absorption is very small and no neutralization of the scrubbing water is therefore necessary. 2500 l. of water per minute is led in through the nozzles of the topmost stage at 5° C. and the hot water obtained is recirculated through the nozzles into the next underlying stage. The hot water departing from the lowest stage at a temperature of 62° C. and a pH of 3.5. The general composition was

| | Mg./l. |
|---|---|
| $Na_2O$ | 36 |
| $SO_3^{2-}$ | 25 |
| $SO_4^{2-}$ | 50 |
| $Cl^-$ | 10 |

EXAMPLE 2

50,000 m.$^3$/h. flue gases from combusting waste liquor from sulphate cellulose process including 0.4 g./m.$^3$ solid particles, substantially $Na_2SO_4$ and soot, and 0.05% $SO_2$ and 0.005% HCl were led at a temperature of 130° C. and a dew point of 64° C. to a horizontal washing plant, in the washing portion of which gas was caused to contact, in counter current, alkaline washing liquid having pH 7.0.

The washing plant comprises a horizontally supported cylinder according to FIG. 5, having an inner diameter of 4.8 m., wherein the gas is taken through a parallel-epipedic pipe in the one end plate having a width of 3 m. and a height of 4.5 m. The gas is wetted in the wetting device 300 l./min. alkaline washing liquid, which is injected at a pressure of 3 kp./cm.$^2$ through 22 nozzles disposed immediately above the gas intake.

The washing plant is divided up into a washing zone and six chambers having 3 m. high partitions departing alternately from the upper and lower portion of the cylinder. The chambers are disposed in the following manner:

Washing section A, 45 nozzles at 20 l./min. and 3 kg./cm.$^2$
Washing section B, 45 nozzles at 20 l./min. at 3 kg./cm.$^2$
Sedimentation section no nozzles
Cooling sections:
   C, 45 nozzles at 120 l./min. at 1 kg./cm.$^2$ D, 45 nozzles at 120 l./min. at 1 kg./cm.²
E, 45 nozzles at 120 l./min. at 1 kg./cm.²

Washing liquid, 10 l/min. caustic liquor containing 200 g./l. NaOH, was supplied and 100 l./min. water into chamber B. A portion was recirculated whilst another portion was removed from the bottom and pumped over into chamber A. Recirculation was also partly carried out here via the first nozzle bank in the wetting zone for saturating incoming gas, partly via the nozzle of the chamber. The collected washing liquid was removed via a level control and transferred to the causticization section of the sulphate plant and had the following composition:

| | G./l. |
|---|---|
| $Na_2O$ | 8 |
| $SO_3^{2-}$ | 8 |
| $CO_3^{2-}$ | 2.4 |
| $SO_4^{2-}$ | 2.2 |
| $S_2O_3^{2-}$ | 0.5 |
| $Cl^-$ | 1.0 |

The gas, subsequent to the washing process, passed through the settling zone where the majority of liquid droplets settle and are passed over to chamber B through a spillway. In this way the percentage of salt in the obtained hot water is considerably reduced.

In the cooling sections C–E the gas is contacted in counter current with water in an amount of 2000 liters per minute which is first introduced through a nozzle bank in the chamber E and thus has a temperature of 5° C. The water is led away from the bottom of section C via a level control for direct use in the bleaching section of the sulphate plant. The water has a temperature of 60° C. and a pH value of 4.0 and had the following composition:

| | Mg./l. |
|---|---|
| NaO | 61 |
| $SO_3^{2-}$ | 63 |
| $SO_4^{2-}$ | 30 |
| $Cl^-$ | 15 |

EXAMPLE 3

90,000 m.³/h. of flue gases obtained from the combustion of waste liquor from the sulphite cellulose process, containing 0.5 g./m.³ of solid particles, mainly $Na_2SO_4$ and soot, and 0.32% of $SO_2$ and 0.010% of HCl, are passed at a temperature of 120° C. and a dew point of 65° C. to a vertical scrubber device of 5.5 m. diameter, wherein the gas is first wetetd with 300 l. of pure water at 20° C. per minute, whereby simultaneously the major portion of the gas content of $Na_2SO_4$, soot and HCl is washed out, while its $SO_2$ content is slightly reduced. The water supplied is injected at 2.4 kg./cm.² pressure through 16 nozzles disposed in two vertical rows at each side of the gas inlet. The not vaporized water is allowed to leave freely from an outlet in the bottom of the scrubber device.

After being saturated, the gas passes through a droplet separator disposed immediately above the gas inlet and consisting of 15 mm. wide slots and impact plates disposed thereabove, the gas being conducted at a velocity of 10 m./s. toward said plates.

The gas is then passed to a washing zone comprising two collecting bottoms and two nozzle banks of the type disclosed in Example 1 and FIGS. 1 to 4. In the washing zone the gas first passes a bottom with gas passages and colecting troughs and then a nozzle bank of 80 full-cone nozzles placed 3 m. above the collecting bottom, each having a capacity of 25 l./min. at 1.5 kg./cm.² nozzle pressure, then a further collecting bottom and a nozzle bank having a similar nozzle equipment.

Alkaline washing liquid consisting of a sulphite solution at pH 7.2 is supplied to the top nozzle bank at a rate of 500 l./min., is recirculated over said nozzle bank, transferred to the lower nozzle bank and recirculated there. A corresponding amount of liquid is withdrawn over a spill-way from the lower nozzle bank. Due to absorption of $SO_2$ from the flue gas, the pH of the exiting washing liquid is reduced to 6.3.

After washing, the gas passes a droplet separator disposed immediately above the washing zone and comprising 6 wire mesh elements of 300 mm. width and 100 mm. thickness, disposed at a spacing of 460 mm. between gas-tight plates, whereby the amount of droplets is reduced to about 3 mg. of NaOH per m.³ of flue gas.

The gas is then cooled in three steps in the cooling zone of the washing device. Each step comprises a collecting bottom and a nozzle bank of the type disclosed in Example 1 and FIGS. 1 to 4. There are 80 nozzles in each step, each nozzle having a capacity of 75 l./min. at 0.5 kg./cm.². Water at 10° C. is supplied to the nozzles of the upper step at a rate of 3000 l./min., is recirculated and transferred to the next lower nozzle bank, whereupon it is again recirculated etc. Hot water at a temperature of 64° C. and a pH of 3.5 is withdrawn from the lowermost collecting bottom.

The composition of said hot water is as follows:

| | Mg./l. |
|---|---|
| $Na_2O$ | 50 |
| $SO_3^{2-}$ | 36 |
| $CO_4^{2-}$ | 75 |
| $Cl^-$ | 12 |

We claim:

1. A method for heating water which is sufficiently pure to allow its use in pulp washing and/or pulp bleaching processes, employing waste gases obtained from burning waste liquor from the sulphite or sulphate cellulose processes, which comprises first purifying the waste gases by atomizing an aqueous alkaline liquid into the waste gases which are at a temperature within the range of from about 100 to about 140° C., thereby effecting good contact of the alkaline liquid with the waste gases and substantially removing solid particles, sulphur dioxide and hydrogen chloride from the waste gases, atomizing water at a temperature within the range from about 5 to about 55° C., countercurrently contacting the atomized water with the washed gases to heat the water to a temperature of greater than about 50° C., sufficiently high to enable use of the hot water in pulp washing and/or pulp bleaching processes, and employing the hot water in pulp washing and/or pulp bleaching processes.

2. A method in accordance with claim 1, which comprises separating dust from the waste gases by passing them through a mechanical or electrical dust separation device and then purifying them.

3. A method in accordance with claim 1, which comprises separating entrained liquid droplets from the waste gases treated with atomized alkaline liquid by impingement upon a wire mesh or impact separator.

4. A method in accordance with claim 1, including, in addition, the step of saturating the waste gases from burning waste liquor from the sulphite or sulphate cellulose processes with water and cooling the gases down to the dew point.

5. A method in accordance with claim 1, wherein the alkaline aqueous liquid atomized into the waste gases has a pH within the range from about 7 to about 10.

6. A method in accordance with claim 5, comprising in addition bringing the pH of the aqueous alkaline liquid employed in the atomizing step to within the range from about 7 to about 10 by adding thereto an alkaline material selected from the group consisting of caustic liquor, white liquor, green liquor, an alkaline carbonate or an alkaline sulphide.

7. A method in accordance with claim 1, wherein the steps of atomizing water and countercurrently contacting the water with washed waste gases are repeated at least once.

8. A method in accordance with claim 1, wherein the water to be heated has a pH within the range from about 3 to about 7.

9. Apparatus for producing hot water of over 50° C. for use in pulp washing and/or pulp bleaching, using as a source of heat hot waste gases from the burning of waste liquor from the sulphite or sulphate cellulose pulping process, comprising, in combination, a spray tower including a gas scrubber section and a gas-water heat exchanger section; means for wetting the hot gases before the gases enter the scrubber; means for feeding the wetted hot waste gases into the scrubber; means for dispersing aqueous alkaline liquid in droplet form into the hot waste gases; means for removing spent alkaline washing liquid; means for withdrawing washed hot waste gases from the scrubber and feeding them to the heat exchanger in flow relation to and in heat exchanging contact with cold water, thereby heating the water and cooling the gases; means for dispersing cold water into the washed hot waste gases; means for venting gases from the heat exchanger; means for recovering hot water from the heat exchanger, and means for conveying the recovered hot water for use in pulp washing and/or pulp bleaching.

10. Apparatus according to claim 9 in which the means for feeding washed hot waste gases is positioned so that the gases are directed in counter-flow relation to the cold water in the heat exchanger.

11. Apparatus according to claim 10 in which the heat exchanger is provided with baffle means to define a zig-zag path for the gas passing therethrough.

References Cited

UNITED STATES PATENTS

| | | | |
|---|---|---|---|
| 2,333,193 | 11/1943 | Persson et al. | 55—93 X |
| 2,470,438 | 5/1949 | Jackson et al. | 55—94 |
| 2,590,905 | 4/1952 | Tomlinson et al. | 55—80 |
| 2,720,280 | 10/1955 | Doyle | 261—148 X |
| 2,868,524 | 1/1959 | Annable et al. | 55—94 X |
| 3,370,402 | 2/1968 | Nakai et al. | 23—2 X |
| 3,376,102 | 4/1968 | Venemark | 23—2 |

OTHER REFERENCES

Rosenblad: "A New Method of Heat Recovery From Intermittent Sources," Technical Association Papers, Series XX, 1937 pages 118–126.

S. LEON BASHORE, Primary Examiner

F. FREI, Assistant Examiner

U.S. Cl. X.R.

23—2; 55—73, 80, 89, 94, 223, 267; 162—51, 239; 261—115, 128, 148